United States Patent
Perraud (10) Patent No.: US 10,306,182 B2
(45) Date of Patent: May 28, 2019

(54) METHOD AND SYSTEM FOR IMPROVING VIDEO QUALITY DURING CALL HANDOVER

(71) Applicants: Eric Perraud, Plaisance du touch (FR); Intel Corporation, Santa Clara, CA (US)

(72) Inventor: Eric Perraud, Plaisance du touch (FR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/575,768

(22) PCT Filed: Jun. 26, 2015

(86) PCT No.: PCT/IB2015/001814
§ 371 (c)(1),
(2) Date: Nov. 20, 2017

(87) PCT Pub. No.: WO2016/207688
PCT Pub. Date: Dec. 29, 2016

(65) Prior Publication Data
US 2018/0124355 A1 May 3, 2018

(51) Int. Cl.
*H04N 7/14* (2006.01)
*H04W 36/02* (2009.01)

(52) U.S. Cl.
CPC .......... *H04N 7/147* (2013.01); *H04W 36/023* (2013.01)

(58) Field of Classification Search
CPC combination set(s) only.
See application file for complete search history.

(56) References Cited

U.S. PATENT DOCUMENTS

2004/0193762 A1* 9/2004 Leon ................. H04L 29/06027
710/52
2013/0170471 A1* 7/2013 Nix ....................... H04W 36/00
370/331

FOREIGN PATENT DOCUMENTS

EP 1843529 A 10/2007
JP 2011082699 A 4/2014

OTHER PUBLICATIONS

"International Application Serial No. PCT/IB2015/001814, International Search Report dated Feb. 11, 2016", 4 pgs.
(Continued)

*Primary Examiner* — Phung-Hoang J Nguyen
(74) *Attorney, Agent, or Firm* — Schwegman Lundberg & Woessner, P.A.

(57) ABSTRACT

A user equipment (UE) and method of improving video call quality during handover are generally described. After determining that handover has started (306), the UE may suspend (308) frame transmission and store the frames. After determining that handover has completed (310), the UE may discard (312) frames whose age exceeds a predetermined percent of a latency deviation computed from a real-time transport control protocol report. The UE may determine whether transmission of the remaining frames would exceed a delay proportional to a video frame interval multiplied by an uplink bandwidth for a cell to which the UE is connected or a maximum bitrate of a guaranteed bitrate bearer multiplied by a typical period for a non-access stratum bandwidth and discard frames in order of decreasing age until neither the bitrate nor the delay is exceeded by the transmission.

26 Claims, 5 Drawing Sheets

(56) References Cited

OTHER PUBLICATIONS

"International Application Serial No. PCT/IB2015/001814, Written Opinion dated Feb, 11, 2016", 8 pgs.
"Universal Mobile Telecommunications System (UMTS); LTE; Transparent end-to-end Packet-switched Streaming Service (PSS); Real-time Transport Protocol (RTP) usage model (3GPP TR 26.937 version 11.0.0 Release 11)", Technical Report, European Telecommunications Standards Institute (ETSI), 650, Route Des Lucioles ; F-06921 Sophia-Antipolis ; France, vol. 3gpp Sa 4, (Oct. 1, 2012).
Dongwook, Lee, et al., "Seamless media streaming over mobile IP-enabled wireless Lan", Consumer Communications and Networking Conference, 2005. Ccnc. 2005 Second Ieee, Ieee, Piscataway, NJ, USA, (Jan. 3, 2005), 116-121.

* cited by examiner

METHOD AND SYSTEM FOR IMPROVING VIDEO QUALITY DURING CALL HANDOVER

This application is a U.S. National Stage Filing under 35 U.S.C. 371 from International Application No. PCT/IB2015/001814, filed Jun. 26, 2015 and published in English as WO 2016/207688 on Dec. 29, 2016, which is incorporated herein by reference in its entirety.

TECHNICAL FIELD

Embodiments pertain to transmitting packetized video data using radio access networks. Some embodiments relate to handover during a voice-over-cellular or voice-over-IMS call.

BACKGROUND

Use of wireless communication systems such as Third Generation Partnership Project Long Term Evolution (3GPP LTE) networks and LTE advanced (LTE-A) networks has increased dramatically year-to-year. The use of mobile user equipment (UE) such cellular telephones, smart phones, laptop computers and tablets to communicate through various radio access networks including LTE networks has recently resulted in approximately 90% penetration of such UEs into households in the United States. The content provided by such UEs includes voice, messaging and video data, each of which is typically packetized for transmission through one or more packet-switched networks.

The wireless communication systems include base stations (enhanced Node Bs (eNBs)) that may support various types of communication. Mobile UEs connect through a particular eNB to receive various types of data from other UEs or servers through the network. As each mobile UE moves geographically across a serving cell, the UE may eventually be handed off from the serving eNB to another, target eNB. During the handover, however, one or more data packets may be lost. This may raise a particular issue in cases in which the handovers are relatively frequent, e.g., due to a high rate of transition of the mobile UE across the geographical area forming the cell. While voice data may be fairly robust when it comes to packet loss, as a loss in voice quality may not be perceptible (or minimally perceptible) to the user because audio data are self-decodable, video data, on the other hand, may be particularly susceptible to packet loss, because the quality of video data decoding depends on previous decoded video data, causing a noticeable loss in quality. It thus may be desirable to reduce and/or compensate packet loss during handover.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
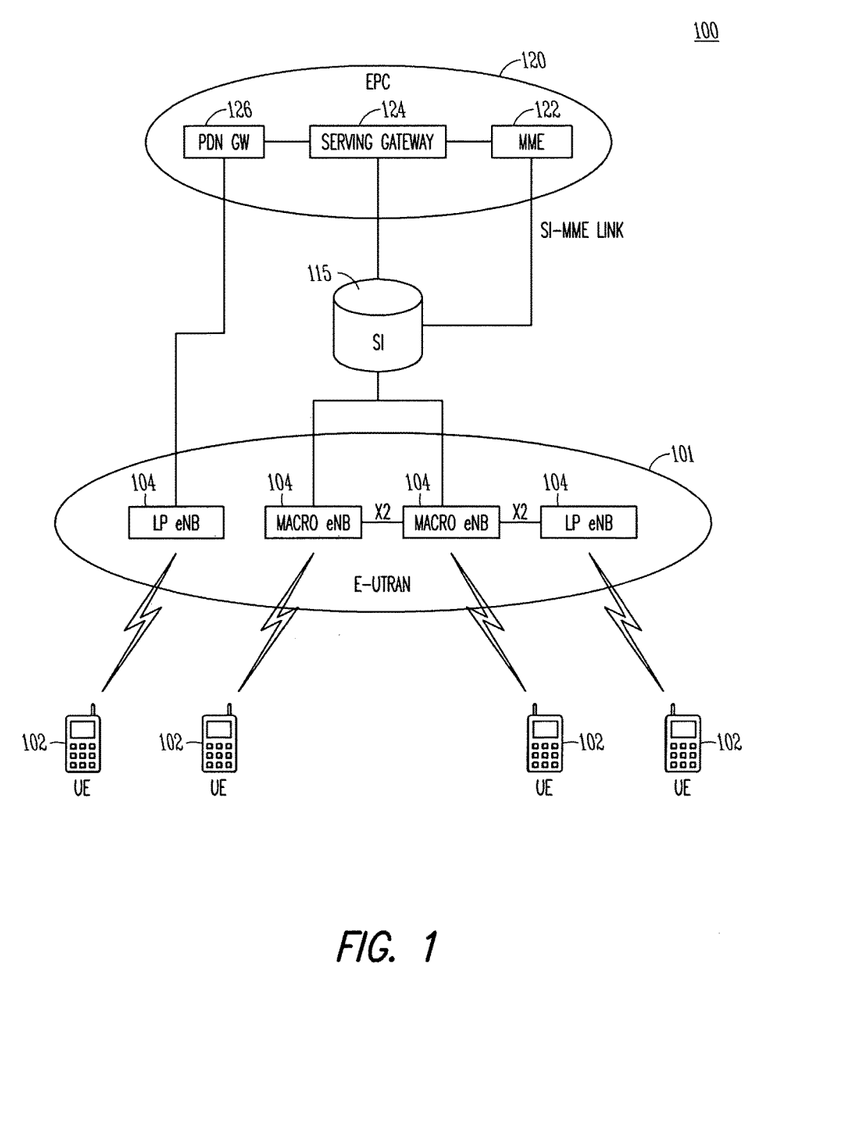
FIG. 1 shows an example of a portion of an end-to-end network architecture of an LTE network with various components of the network in accordance with some embodiments.

FIG. 1 shows an example of a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity, only a portion of the core network 120, as well as the RAN 100, is shown in the example.

The core network 120 includes mobility management entity (MME) 122, serving gateway (serving GW) 124, and packet data network gateway (PDN GW) 126. The RAN includes enhanced node Bs (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) may terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with some embodiments, UEs 102 may be configured to communicate OFDM communication signals with an eNB 104 over a multicarrier communication channel in accordance with an OFDMA communication technique. The OFDM signals may comprise a plurality of orthogonal subcarriers. Other examples of multiple-access systems and signals include Non-Orthogonal Multiple Access (NOMA), Code Division Multiple Access (CDMA), Time Division Multiple Access (TDMA), Frequency Division Multiple Access (FDMA), Orthogonal Frequency-Division Multiple Access (OFDMA) and Single-Carrier FDMA (SC-FDMA) systems and signals.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a microcell. Femtocell eNBs are typically provided by a mobile network operator to its residential or enterprise customers. A femtocell may be the size of a residential gateway or smaller, and generally connect to a broadband line. Once plugged in, the femtocell may connect to the mobile operator's mobile network and provide additional coverage in a much smaller range than a typical cell, e.g., typically 30 to 50 meters for residential femtocells. Thus, a LP eNB might be a femtocell eNB since it is coupled through the PDN GW 126. Similarly, a picocell may be a wireless communication system typically covering a small area, such as in-building (offices, shopping malls, train stations, etc.), or in an aircraft or train. A picocell eNB can generally connect through the X2 link to another eNB such as a macro eNB through its base station controller (BSC) functionality. Thus, the LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. The eNB may schedule uplink and downlink transmissions over a variety of frequency bands. The allocation of resources in subframes used in one frequency band and may differ from those in another frequency band. Each slot of the subframe may contain 6-7 symbols, depending on the system used. In some embodiments, the subframe may contain 12 or 24 subcarriers. A resource grid may be used for downlink and uplink transmissions between an eNB and a UE. The resource grid may be a time-frequency grid, which is the physical resource in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE in the current 3GPP standard. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain corresponds to one subframe or two resource blocks. Each resource grid may comprise 12 (subcarriers)*14 (symbols)=168 resource elements for normal cyclic prefix (CP) case. Several different physical channels may be conveyed using such resource blocks.

There may be several different physical channels that are conveyed using resource blocks. These physical channels may include a physical downlink control channel (PDCCH) and physical downlink shared channel (PDSCH) in a downlink transmission and a physical uplink control channel (PUCCH) and physical uplink shared channel (PUSCH) in an uplink transmission. Each subframe may be partitioned into the PDCCH and PDSCH or PUCCH and PUSCH. The PDCCH may normally occupy the first two symbols of each subframe and carry, among other things, information about the transport format and resource allocations related to the PDSCH and PUSCH, as well as H-ARQ information related to the uplink or downlink shared channel. The PDSCH may carry user data and higher layer signaling to a UE or eNB and occupy the remainder of the subframe. The PUSCH may be shared by UEs to transmit data to the network. The scheduling is controlled by the eNB. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

The PUCCH may carry information including Uplink Control Information (UCI), similar to the DCI of the PDCCH. The PUCCH may be mapped to a control channel resource defined by a code and two resource blocks, consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate the current channel conditions and, if MIMO transmission is used by the UE, may include MIMO-related feedback.

Figure 2:
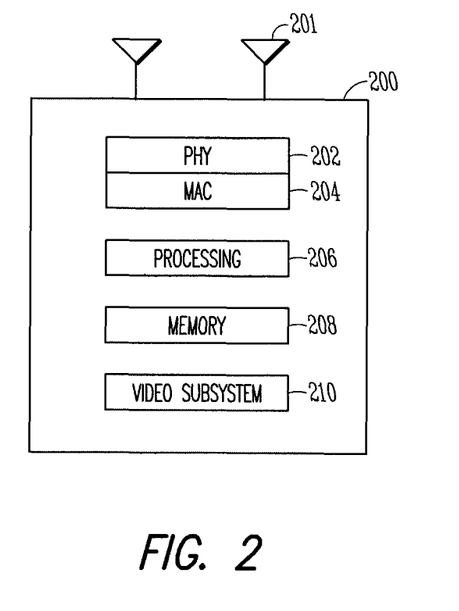
FIG. 2 shows a functional block diagram of an example of a UE in accordance with some embodiments.

FIG. 2 illustrates a functional block diagram of a UE in accordance with some embodiments. The UE 200 may be suitable for use as any one or more of the UEs 102 illustrated in FIG. 1. The UE 200 may include physical layer (PHY) circuitry 202 for transmitting and receiving radio frequency electrical signals to and from one or more nodes of a radio access network such as eNBs 104 (FIG. 1) using one or more antennas 201. The PHY layer circuitry 202 may include circuitry for modulation/demodulation (e.g., a modem), upconversion/downconversion (e.g., a mixer and oscillator), filtering (e.g., a bandpass or lowpass filter), amplification (e.g., a linear or variable gain amplifier), etc. UE 200 may also include medium access control layer (MAC) circuitry 204 for controlling access to the wireless medium and to configure frames or packets for communicating over the wireless medium. UE 200 may also include processing circuitry 206 and memory 208 (e.g., a physical component that may be referred to as a memory component) arranged to configure the various elements of the UE to perform the operations described herein. The memory 208 may be used to store information for configuring the processing circuitry 206 to perform the operations. The UE may include a video subsystem 210. The video subsystem 210 may include a video codec to digitize video information and to receive and decode video information. The video subsystem 210 may generate frames of video data using the digitized video information produced by the video codec. The video subsystem 210 may also contain an audio codec to digitize voice information and to receive and decode audio information.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the UE 200 may include one or more of a keyboard, a display, a non-volatile memory port, multiple antennas, a graphics processor, an application processor, speakers, and other mobile device elements. The display may be an LCD screen including a touch screen. The UE may thus contain one or more processing components.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3GPP Universal Terrestrial Radio Access Network (UTRAN) LTE or a LTE communication network or a high speed downlink/uplink access (HSDPA/HSUPA) communication network, although the scope of the invention is not limited in this respect.

Typically, real-time audio and video conferencing and communication applications use the Real-time Transport Protocol (RTP) and employ Session Description Protocol (SDP) to specify the technical parameters of the audio and video streams carried in a multi-media session. A set of RTP parameters of the media stream and the compression/encoding methods is the media profile, or RTP audio video profile (RTP/AVP). The RTP Control Protocol (RTCP) provides in an RTCP report out-of-band statistics and control information for an RTP session carrying multimedia data, but does not transport any media data. The RTCP may include, for example, information like the media round-trip time that permits the UE to calculate the average video latency and latency deviation at the receiver (in different embodiments either the UE or the eNB). Video latency deviation may be significant. The RTCP may provide feedback on the quality of service (QoS) by periodically sending statistics information to UEs in the multimedia session. The RTCP may be used to control QoS parameters, e.g., by limiting transmission of the media or using a different encoding or decoding scheme.

As above, issues involving delivery of such real-time packetized video traffic through the network are particularly likely to be noticeable. Such issues may, in the future, only increase with the increasing prevalence of video delivery in everyday use, such as during a video-over-cellular or video-over-IMS call (also referred to as an IMS video call over LTE). In making a video call, often the components of the transmitting UE may not be aware of any events over the radio link that may impact delivery of the video data or quality of the video stream. When a handover between LTE cells occurs, one or more encoded pictures sent to the modem typically may be lost, which may impact the quality of the video call. The impact may be increased if the lost video frames include a reference frame (or reference picture) used for inter-frame prediction. Most presently used video encoding standards, such as MPEG-2 and H.264/AVC standards, include one or more reference frames that are used to define or predict future pictures. If such reference frames are lost, the UE may be unable to decode an entire sequence of frames until a new video reference frame is received. The impact for this may be severe and lead to the loss of a large number of video frames, resulting in a video interruption of several seconds. This may be exacerbated if pico or femto cells are used due to the small size of the cells and the corresponding increased number of handoffs when the UE is in motion.

Figure 3:
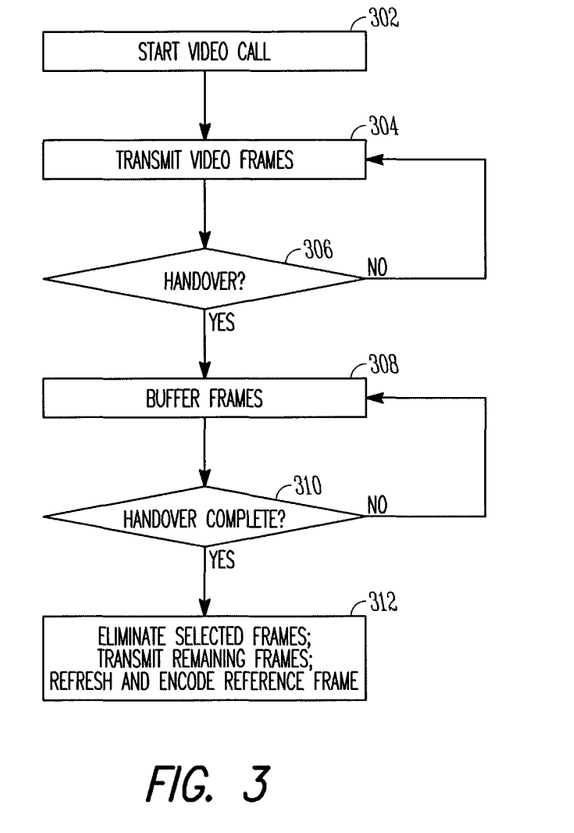
FIG. 3 shows a flow diagram of an example of a method of reducing video frame loss of a video call during handover in accordance with some embodiments.

FIG. 3 shows a flow diagram of an example of a method of reducing video frame loss of a video call during handover. At operation 302 of the method 300, the UE may determine that a video call has been initiated either by the user at the UE or by the UE receiving a video call request from another UE that has been accepted at the UE by the user. The video call may be, for example, a video-over-cellular call or a video-over-IMS call.

The UE may continue to transmit and receive video frames as a set of RTP packets using network resources at operation 304. The UE may be a mobile UE, such as a smartphone. For high resolution video frames, a video frame may be packetized in several RTP packets. For convenience, a video frame is illustrated as a single RTP packet in the figures. A video sequence may contain a reference frame and successive video frames. The reference and successive frames may not be self-decodable. If the reference frame is not received, the entire sequence may not be able decoded and the video interrupted until a new reference frame is received.

At operation 306, the UE may determine whether a handover procedure between eNBs is to be initiated. The UE may determine that handover is desirable, for example, based on a reference signal measurement from one or more of the eNBs from which the UE receives the reference signal. The UE may estimate its distance to the eNB as well as the channel conditions. Alternately, the UE may transmit the measurements to the eNB and the network may initiate the handover procedure, signaling the UE that the handover procedure is starting.

If no handover procedure is to take place, the UE may continue at operation 304 to transmit and receive video frames as a set of RTP packets until the video call ends. However, if the UE determines that the handover procedure is to occur, the UE may continue to encode video packets of the successive video frames but suspend transmission of the encoded video frames. Instead, the UE may at operation 308 start to buffer in memory the encoded video packets that are to be transmitted. In some embodiments, the modem (which operates at the physical layer L1 and L2 layer of the OSI model) may notify the transport layer (L4) about the handover. The transport layer may proceed to buffer the encoded video frames in memory in a video RTP queue (also referred to herein as a video handover queue or a video queue) ($rtpQ_{HO}$) above the modem layers.

Thus, in some embodiments, when a handover occurs during an IMS video call over LTE, the modem of the UE may detect the start of the handover and, in response send an event to the transport layer (or telephony/transport layer) about LTE handover starting. The telephony layer may suspend transmission of video packets (and frames) to the modem (and from the modem, to the eNB and network) and instead buffer the packets in the video RTP queue in memory during handover. The telephony layer may implement a timer T(k,n) or other mechanism to monitor the time of each video packet k of frame n spends in the queue.

The UE may determine whether the handover procedure is complete at operation 310. Until then, the UE may continue to buffer the encoded video frames at operation 308. The handover procedure may be determined to have been completed either in response to the UE determining that the modem has successfully connected to (and thus is communicating through) a different eNB or it has failed but the modem has reestablished a connection with the original eNB.

The modem at operation 312 may subsequently notify the transport layer that the handover procedure has been completed. The modem may also send a notification to the transport layer with information about the uplink bandwidth of the new LTE cell whether or not handover was successful. Upon receiving an indication of this event, the transport layer of the processing circuitry may then use the timer as well as the current time to compute the time each packet in the RTP video queue when the notification of the handover complete event is received.

Upon receiving an indication of this event, the encoded video packets stored in the handover queue may be individually examined and none, some or all of the packets may be discarded depending on the characteristics of each packet. In some embodiments, the processing circuitry may eliminate packets that are too old (or belong to a frame that is too old), that belong to video frames of a video sequence whose reference frame is known to be lost before the handover, or older packets if the amount of data to transmit exceeds a predefined threshold amount.

In some embodiments, the age determination may be dependent on or proportional to a latency deviation ($\sigma_{lvid}$) computed from the RTCP report. Typically, when a video call over IMS is made, the video layer of the UE computes the average video latency ($l_{vid}$) and latency deviation using the RTCP reports. Packets transmitted from the UE to a receiving UE may be put in a static or dynamic jitter buffer of the receiving UE under certain circumstances. In VOIP communications, the jitter buffer intentionally delays arriving packets that have variations because of network congestion, timing drift, or route changes so that the end user experiences a connection with few distortions. The video layer provides average video latency and latency deviation, as well as the video frame interval to the telephony layer to determine whether or not to send a particular video packet. Frames that are within the threshold age (i.e., if the end-to-end latency of video frame n is acceptable, packet k of frame n, age (k, n)<$\alpha^*\sigma_{vid}$) may be put in the video jitter buffer of the receiving UE, decoded and successfully played on the rendering user interface of the receiving UE. However, frames whose overall latency is too large if transmitted immediately after the handover completes (i.e., for packet n of frame k, age(k, n)>$\alpha^*\sigma_{vid}$), may be deemed too late and not accepted or may be discarded by the receiving UE jitter buffer. As such frames may not be accepted by the receiving UE, to save power and network resources, packets of these frames may thus be discarded by the memory prior to be transmitted by the UE.

In some embodiments, a may be a predetermined parameter or may be tuned on a per-application basis. In some embodiments, a may depend on the use case. For example, if the application is a conversational application (e.g., video telephony), high latency is to be avoided at handover. In this case, a may be relatively small, in the 1-1.5 range. If the application is a streaming application, a larger handover latency may be accommodated. This is to say that a can be higher, in the 1.5 to 2.5 range.

Figure 4:
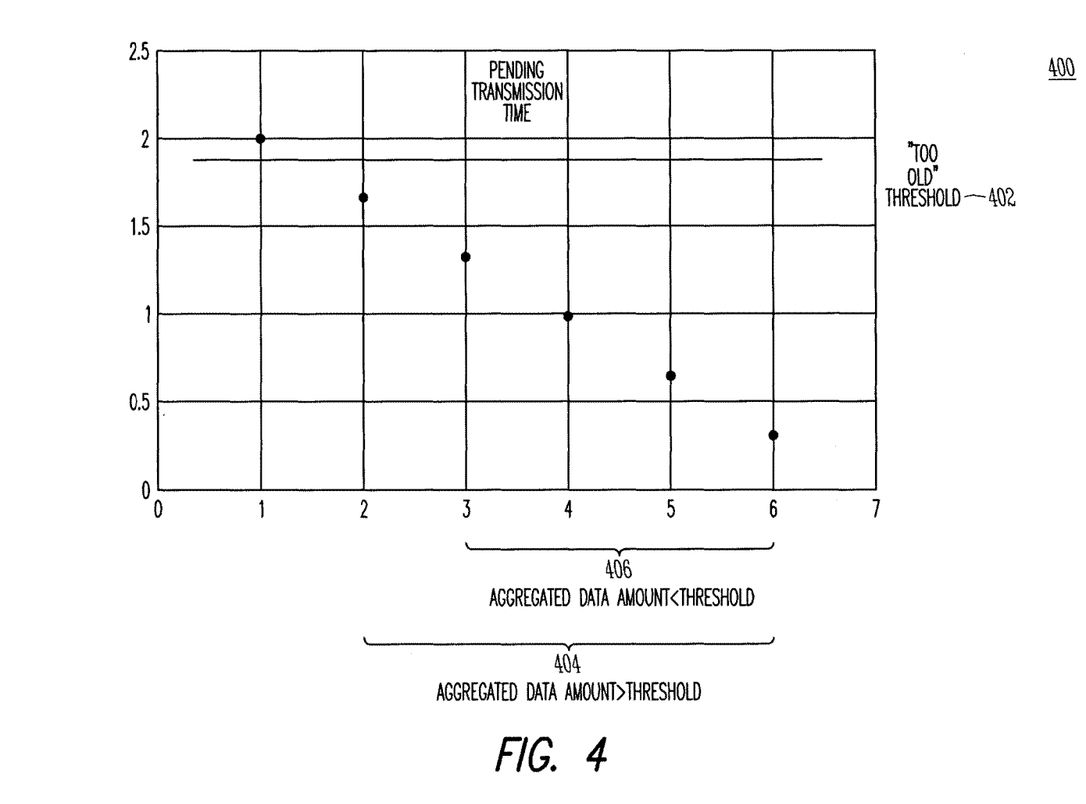
FIG. 4 is a graph illustrating the disposition of buffered frames.

FIG. 4 is a graph illustrating the disposition of buffered frames. The example graph 400 shows six frames stored in the buffer at the completion of a handover event, which may take several seconds to complete. In the example shown, a "Too Old" threshold 402 exists just below two units of time (for convenience, seconds), although the time shown is merely exemplary and is in no way limiting. This is to say that frames older than the "Too Old" threshold 402, as shown in FIG. 4, frame 1, may be discarded by the memory rather than being transmitted by the UE. In the example of the graph of FIG. 4, only the first video frame is determined to exceed the age threshold.

However, even if the frames may not be too old, other issues may arise in transmitting the remaining frames. As above, the aggregated amount of data to transmit may exceed a predefined threshold amount of data. In some embodiments, the transport layer may determine whether transmission of the remaining video frames would delay transmission of a new video frame created after handover has completed. If so, the transport layer may eliminate data in a frame-by-frame or packet-by-packet manner, starting from the oldest video frame, recalculating until the transport layer determines that transmission of the remaining video frames would not delay transmission of a new video frame. In other embodiments, the transport layer may determine the excess amount of data in the queue to be transmitted and, using a known or estimated video frame size of video frames in the queue, determine the number of video frames to eliminate and discard the oldest set of video frames of the same number. In some embodiments, to determine whether transmission of the remaining video frames would delay transmission of a new video frame, the threshold amount of data to transmit may depend on or be proportional to the LTE uplink cell bandwidth and/or the Non-Access Stratum (NAS) uplink maximum bitrate.

In particular, in some embodiments, the aggregated amount of video frames buffered in the queue during handover and sent to the modem may be limited to not exceed video frame interval* expected bitrate on the new LTE cell. In some embodiments, this may be adjusted after the first LTE transmissions of the video packets in the queue. If the modulation after an handover is QPSK, the expected bitrate on new cell may be: maximum uplink QPSK bitrate for the new cell (8 kbps if the new LTE is a 10 MHz cell, 14 kbps if it is a 20 MHz cell)*β. β may be a safety coefficient, which in some exemplary embodiments, is in the 0.5 to 0.7 range. In some embodiments, β may be adjusted after the first LTE transmissions of the video frames in the queue.

In some embodiments, video-over-LTE is conveyed by a guaranteed bitrate bearer inside the network, in which the dedicated bearer has a maximum bitrate. In this case, the instantaneous transmission of the video frames in the queue may be limited so as not to create a peak of data transmission in the video bearer that exceeds the maximum uplink bitrate of the bearer. If transmission of the video data were to exceed the maximum uplink bitrate of the bearer, at least some of the video data may be discarded inside the network. Thus, in some embodiments, the aggregated amount of video frames buffered in the queue during handover and sent to the modem may be limited to not exceed the maximum uplink bitrate*a typical period for defining the uplink NAS bandwidth, which may be known by the transport layer of the processing circuitry when the call is established. Similar to the above, in some embodiments, the transport layer may determine whether transmission of the remaining video frames would exceed the maximum uplink bitrate*a typical period for defining the uplink NAS bandwidth. If so, the transport layer may eliminate data in a frame-by-frame or packet-by-packet manner, starting from the oldest video frame, recalculating until the UE determines that transmission of the remaining video frames would not the maximum uplink bitrate*a typical period for defining the uplink NAS bandwidth. In other embodiments, the transport layer may determine the excess amount of data in the queue to be transmitted and, using a known or estimated video packet size of video frames in the queue, determine the number of video frames to eliminate and discard the oldest set of video frames of the same number.

Six video frames are initially shown as being stored in the queue in FIG. 4. After discarding the first video frame for exceeding the age threshold 402, the UE determines whether transmission of the remaining five video frames would in aggregate exceed the predetermined threshold amount of data. As can be seen, two sets of video frames are shown in FIG. 4, a first set 404 containing all of the video frames, whose aggregate amount of data exceeds the threshold amount of data and a second set 406 containing only some of the video frames (as shown, four of the remaining five frames), whose aggregate amount of data does not exceed the threshold amount of data.

Figure 5:
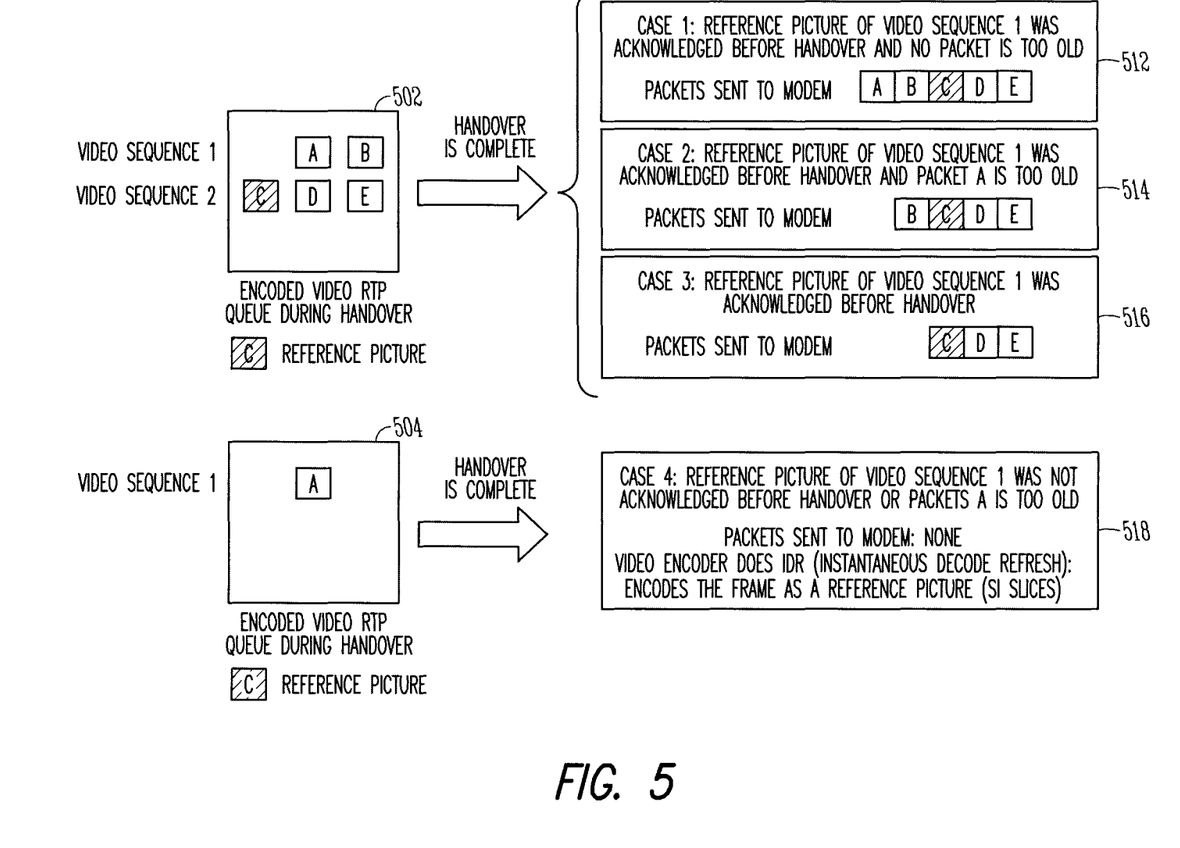
FIG. 5 illustrates examples of video packets in a queue and subsequent disposition cases in accordance with some embodiments.

In some embodiments, the processing circuitry may also discard video packets that belong to video frames of a video sequence whose reference frame is known to be lost before the handover, irrespective of the age and/or amount of data to be transmitted. This may be performed prior to determining the age or performing data amount transmission calculations and may be performed prior to storing data in the RTP video queue. FIG. 5 illustrates examples of video packets in a queue and subsequent disposition cases in accordance with some embodiments. In FIG. 5, encoded video packets 502 that are stored in the queue include two sequences, video sequence 1 containing video packets A and B, whose reference frame was transmitted prior to the handover event, and video sequence 2 containing video packets C, D and E, whose reference frame is video packet C.

The processing circuitry may discard video packets of a video frame in the queue whose reference frame is known to be lost before the handover as the receiver may be unable to decode the video packets belonging to the associated video sequence. The video frames transmitted by the UE have RTP sequence numbers that increase in value with increasing time. In some embodiments, the video receiver may send feedback in the form of a NACK list with a list of missing video frames. The UE may determine that it is likely the receiving UE has received the last reference frame transmitted by the UE in response to receiving a NACK list in which the sequence number of the reference frame are not in the NACK list and the maximum sequence number of the missing video frames is larger than the RTP sequence numbers of the last transmitted reference frame. In this case, the UE may determine that the last reference frame was successfully received, and the video packets of the video frame of the video sequence in the RTP video queue may be transmitted as the receiving UE is able to use inter-frame prediction on the video packets in the RTP video queue. This is shown in Case 1 512 of FIG. 5, in which all of the video packets of the frames are sent from the video queue to the modem and in Case 2 514, in which all of the video frames other than video frame A, which is too old, are sent from the video queue to the modem.

In response to the UE determining, however, that the last transmitted reference frame was not successfully received by the receiving UE, the video packets of the video frame of the video sequence may be discarded either before being stored in the queue or when determining whether or not to transmit the stored video frame. The UE may determine that the receiving UE is unable to decode the stored frames using inter-frame prediction because one or more RTP packets of the reference frame are on the NACK list. This is shown in Case 3 516 of FIG. 5, in which the video packets and frames of sequence 1 are discarded due to the reference frame not being received, but the video packets and frames of sequence 2 are sent from the video queue to the modem. In some embodiments, the UE may discard packets of the reference frame in response to determining that retransmission of the reference frame packets would employ too many resources, such as modem and video decoding resources.

If the reception status of the reference frame by the receiving is not known, e.g. because a NACK list was not received or the last NACK list received the maximum sequence number of the missing video frames was smaller than the RTP sequence numbers of the last transmitted reference frame, in some embodiments the UE may decide that the reference frame was successfully received. This may be based on the fact that close to handover, the RTCP feedback may be returned fairly quickly and thus the NACK list may be reasonably up-to-date.

The transport layer may subsequently forward all of the remaining video frames in the queue to the modem. In some embodiments, the modem may receive the remaining frames in multiple blocks. In some embodiments, the modem may receive the remaining frames in a single communication. The remaining frames may be concatenated, either while in the queue or otherwise prior to being transmitted to the modem or at the modem. The frames may subsequently be transmitted through the network in one or more transport blocks with minimal latency.

If no frames remain in the queue, the transport layer may instruct the video encoder to perform an Instantaneous Decoder Refresh (IDR) procedure. In FIG. 5, encoded video frame 504 is discarded due to the reference frame not being received or the video frame exceeding the threshold age and thus in Case 4 no video frames are sent to the modem and the IDR is performed on the next video frame generated after the handover to generate a reference frame. An IDR frame is a video frame that decodable independent of preceding video frames, and thus can be played irrespective of what was downloaded and decoded before the arrival of the IDR frame. In one specific example, the modem layer that manages the mobility and handovers of the UE (typically the radio resource control layer—RRC) may forward a handover_complete event to the transport layer of the UE. The notification subsequently may be sent to an IMS stack, which may then inform the video layer. In another example, the modem RRC layer may build a local emulated RTCP FIR-type (Full Intraframe Request) report and send it directly to the video layer via a video RTCP path when the handover is complete. The video layer, having received the instruction (either the handover_complete event notification or the RTCP FIR-type report), may in response encode the new video frame as an IDR frame (or reference frame) so that the remote video receiver can perform an accurate inter-frame prediction and decode the video frames of the new sequence. The transmission bitrate may be increased either after handover is completed or after transmission of the stored video packets as the video link quality may be improved. In some embodiments, the transport layer may indicate to the video layer to use a shorter period for its bitrate adaptation algorithm.

In some embodiments, rather than the UE performing all of the functionality described above, at least some of the later functionality may be offloaded to the network, under the MME responsibility. If the MME knows that a device is to handoff from cell A to cell B, when the handover is done, the MME may insert an emulated RTCP FIR-type report into video paths both to the transmitting UE, which performs the handover and the receiving UE. Both UEs may then trigger an IDR procedure on their side. The emulated RTCP reports may be sent earlier than if built locally by the UE, thereby shortening the time when the video frames are unable to be decoded.

The procedure described may improve the quality of the video call by reducing the number of video frames lost during handovers, as well as ensuring that reference frames are transmitted rather than being lost. Moreover, the amount of data sent after the handover may be limited such that it does not exceed the maximum bitrate of the video dedicated bearer. Moreover, while handovers between eNBs is described, the embodiments are not limited solely to LTE cell handovers. Similar functionality may be applied for video call handovers between LTE and WiFi networks (eNB to access points), LTE and 3G networks or other systems in which video calling is able to be employed.

ADDITIONAL NOTES AND EXAMPLES

Example 1 can include an apparatus (such as a user equipment device) configured to control transmission of video data, the apparatus comprising: a processing component and a memory component, the apparatus configured to: in response to identifying a start of a handover event, suspend transmission of the video data and store a first set of the video data in the memory component; in response to detecting completion of the handover event, configure the memory component to remove some of the video data in the first set of stored video data to obtain a second set of stored video data by removing at least one of: video data with pending transmission time that exceeds a threshold pending transmission time, or video data with its transmission that exceeds at least one of a threshold bitrate or threshold delay; and transmit the second set of video data.

Example 2 can include the subject matter of Example 1 and optionally include that the second set of video data comprises an aggregated amount of data in which transmission the aggregated amount of data fails to exceed the threshold bitrate or the threshold delay, and the video data of the first set of video data is removed in order of decreasing pending transmission time to obtain the second set of video data.

Example 3 can include the subject matter of any combination of Examples 1-2 and optionally include that the threshold age is based on a latency deviation computed from a real-time transport control protocol report.

Example 4 can include the subject matter of any combination of Examples 1-3 and optionally include that the threshold delay is proportional to a video frame interval multiplied by an uplink bandwidth of the UE for a cell to which the UE is connected after the completion of the handover event.

Example 5 can include the subject matter of any combination of Examples 1-4 and optionally include that the apparatus is further configured to adjust a constant of proportionality of the threshold delay after one or more initial transmissions of the second set of stored video data subsequent to the completion of the handover event.

Example 6 can include the subject matter of any combination of Examples 1-5 and optionally include that the threshold bitrate is an uplink maximum bitrate of a guaranteed bitrate bearer multiplied by a typical period for defining an uplink non-access stratum bandwidth.

Example 7 can include the subject matter of any combination of Examples 1-6 and optionally include that the physical layer circuitry is configured to transmit the second set of remaining video frames in a minimum number of Long Term Evolution (LTE) transport blocks to provide minimized latency of delivery of the second set of remaining video frames.

Example 8 can include the subject matter of any combination of Examples 1-7 and optionally include that in response to identifying that transmission of the second set of video frames has been completed, the apparatus is configured to request an instantaneous decoder refresh and encoding to be performed on a next video frame as a reference frame.

Example 9 can include the subject matter of any combination of Examples 1-8 and optionally include that the physical layer circuitry is configured to receive feedback containing a list of video frames transmitted by the physical layer circuitry but not received prior to the apparatus determining that the handover event has started, and after the apparatus terminates transmitting the video data, the apparatus is configured to: send the video data to memory in response to unsuccessfully receiving that video packets of a reference frame associated with the video data and transmitted prior to the start of the handover event based on the feedback, and discard the video data in response to unsuccessfully receiving the video packets of the reference frame.

Example 10 can include the subject matter of any combination of Examples 1-9 and optionally include that the apparatus is configured to prohibit retransmission of the video packets of the reference frame in response to unsuccessfully receiving the video packets of the reference frame.

Example 11 can include the subject matter of any combination of Examples 1-10 and optionally include that the apparatus is configured to send the video data to memory in response to failure, based on the feedback, to identify whether the video packets of the reference frame is received successfully.

Example 12 can include the subject matter of any combination of Examples 1-11 and optionally include that the apparatus is configured to: transmit video data, of the second set of video data, associated with video packets of a reference frame that is transmitted from the apparatus and received prior to starting the handover event and associated with video packets of a reference frame stored in the memory after starting the handover event.

Example 13 can include the subject matter of any combination of Examples 1-12 and optionally include that the apparatus is configured to: configure the physical layer circuitry to increase a bitrate of transmission after completing the handover event.

Example 14 can include the subject matter of any combination of Examples 1-13 and optionally include an antenna configured to transmit and receive communications between the physical layer circuitry and the one or more nodes of the radio access network.

Example 15 can include subject matter of a computer readable storage medium including instructions that, when executed by hardware processing circuitry of user equipment (UE), cause the UE to: store video frames of a video call during handover; determine, after handover has completed, a set of the stored video frames having a predetermined set of characteristics determined contemporaneously with completion of handover; discard the set of the stored video frames, leaving remaining video frames; and transmit the remaining video frames, wherein the predetermined set of characteristics includes frame age over a predetermined percent of a latency deviation computed from a real-time transport control protocol report and aggregated size of the remaining video frames over a predetermined size.

Example 16 can include the subject matter of Example 15 and optionally include instructions that when executed by the hardware processing circuitry cause the UE to, prior to discarding the set of video frames: determine, prior to transmission, whether transmission of the remaining video frames would exceed at least one of a threshold bitrate or threshold delay, and in response to determining that transmission of the remaining video frames would exceed the at least one of a threshold bitrate or threshold delay, add an oldest of the video frames to the set of the video frames until determining that transmission of the remaining video frames would exceed neither the threshold bitrate nor the threshold delay.

Example 17 can include the subject matter of any combination of Examples 15-16 and optionally include at least one of that the threshold delay is proportional to a video frame interval multiplied by an uplink bandwidth of the UE for a cell to which the UE is connected after the completion of the handover event, and the threshold bitrate is an uplink maximum bitrate of a guaranteed bitrate bearer multiplied by a typical period for defining an uplink non-access stratum bandwidth.

Example 18 can include the subject matter of any combination of Examples 15-17 and optionally include instructions that when executed by the hardware processing circuitry cause the UE to at least one of: in response to determining that transmission of the remaining video frames has been completed, perform an instantaneous decoder refresh and encoding on a next video frame as a reference frame; and determine, from a list of video frames transmitted by the UE but not received prior to the handover starting, whether video packets of a reference frame associated with at least some of the remaining video frames has been successfully received, and discard the at least some of the remaining video frames associated with the reference frame in response to determining that the video packets of the reference frame have not been successfully received.

Example 19 can include the subject matter of suspending transmission of and storing video frames of a video call during handover; identifying, after handover has completed, which portions of the stored video data satisfy a set of characteristics, wherein the set of characteristics includes pending transmission time less than or equal to a predetermined percent of a latency deviation computed from a real-time transport control protocol report and aggregated size of the remaining video data less than or equal to a predetermined size; and transmitting the portions of the stored video data that satisfy the set of characteristics.

Example 20 can include the subject matter of Example 19 and optionally include: identifying, prior to transmission, if transmission of the remaining video data exceeds at least one of a threshold bitrate or threshold delay and if transmission of the remaining video data exceeds the at least one of a threshold bitrate or threshold delay, adding an oldest of the video data to the set of the video data until transmission of the remaining video data exceeds neither the threshold bitrate nor the threshold delay.

Example 21 can include the subject matter of any combination of Examples 19-20 and optionally include at least one of that the threshold delay is proportional to a video frame interval multiplied by an expected uplink bandwidth of the apparatus for a cell to which the apparatus is connected after completing the handover event and the threshold bitrate is an uplink maximum bitrate of a guaranteed bitrate bearer multiplied by a typical period for defining an uplink non-access stratum bandwidth.

Example 22 can include the subject matter of any combination of Examples 19-21 and optionally include if transmission of the remaining video data is completed, performing an instantaneous decoder refresh and encoding on a next video frame as a reference frame.

Example 23 can include the subject matter of any combination of Examples 19-22 and optionally include identifying, from a list of video frames transmitted by the apparatus but not received prior to the handover starting, if video packets of a reference frame associated with at least some of the remaining video data is successfully received and discarding the at least some of the remaining video data associated with the reference frame if the video packets of the reference frame is not successfully received.

Example 24 can include the subject matter of any combination of Examples 19-23 and optionally include prohibiting retransmission of the video packets of the reference frame after the handover is completed if the video packets of the reference frame is not successfully received, storing video data in response to if failure to identify if the video packets of the reference frame is successfully received, and increasing a transmission bitrate after completing the handover.

Example 25 can include the subject matter of any combination of Examples 19-24 and optionally include that the handover comprises shifting transmission of the video call from a first external device to a second external device.

Example 26 can include the subject matter of any combination of Examples 19-25 and optionally include that the set of characteristics is determined contemporaneously with completion of the handover.

Example 27 can include the subject matter of any combination of Examples 19-26 and optionally include that transmitting the portions of the stored video data that satisfy the set of characteristics comprises transmitting only the portions of the stored video data that satisfy the set of characteristics Example 27 can include the subject matter of processing circuitry configured to: receive handover of user equipment (UE) from another eNB; and configure a transceiver to transmit a set of video frames through a network after receiving the set of video frames from the UE, wherein the set of video frames are limited to video frames more recent than a predetermined percent of a latency deviation of a real-time transport control protocol report and whose transmission in aggregate size exceeds neither a threshold bitrate nor a threshold delay, wherein the threshold delay is proportional to a video frame interval multiplied by an uplink bandwidth of the UE, and wherein the threshold bitrate is an uplink maximum bitrate of a guaranteed bitrate bearer multiplied by a typical period for defining an uplink non-access stratum bandwidth.

Example 28 can include the subject matter of Example 27 and optionally include that the processing circuitry is configured to: receive video packets of a reference frame immediately succeeding the set of video frames.

Example 29 can include the subject matter of any combination of Examples 27-28 and optionally include that the processing circuitry is configured to: receive video frames of an increased transmission bitrate from the UE after reception of the set of video frames.

Example 30 can include the subject matter of any combination of Examples 27-29 and optionally include that the processing circuitry is configured to: in response to detecting handover completion, insert an emulated Real-time Transport Protocol Control Protocol (RTCP) FIR-type report into a video path to the UE.

These non-limiting examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus configured to control transmission of video data, the apparatus comprising:
a processing component and a memory component, the apparatus configured to:
in response to identifying a start of a handover event, suspend transmission of the video data and store a first set of the video data in the memory component;
in response to detecting completion of the handover event, configure the memory component to remove some of the video data in the first set of stored video data to obtain a second set of stored video data by removing at least one of:
video data with pending transmission time that exceeds a threshold pending transmission time, or
video data with its transmission that exceeds at least one of a threshold bitrate or threshold delay; and
transmit the second set of video data,
wherein removal of the video data in the first set of stored video data is further dependent on a determination of whether a reference frame related to the video data in the first set of stored video data was successfully received by another apparatus prior to initiation of handover.

2. The apparatus of claim 1, wherein:
the second set of video data comprises an aggregated amount of data in which transmission the aggregated amount of data fails to exceed the threshold bitrate or the threshold delay, and
the video data of the first set of video data is removed in order of decreasing pending transmission time to obtain the second set of video data.

3. The apparatus of claim 1, wherein the threshold pending transmission time is based on a latency deviation computed from a real-time transport control protocol report.

4. The apparatus of claim 1, wherein the threshold delay is proportional to a video frame interval multiplied by an expected uplink bandwidth of the apparatus for a cell to which the apparatus is connected after the completion of the handover event.

5. The apparatus of claim 4, further configured to adjust a constant of proportionality of the threshold delay after one or more initial transmissions of the second set of stored video data subsequent to the completion of the handover event.

6. The apparatus of claim 1, wherein the threshold bitrate is an uplink maximum bitrate of a guaranteed bitrate bearer multiplied by a typical period for defining an uplink non-access stratum bandwidth.

7. The apparatus of claim 1, wherein the apparatus is configured to transmit the second set of stored video data in a minimum number of Long Term Evolution (LTE) transport blocks to provide minimized latency of delivery of the second set of stored video data.

8. The apparatus of claim 1, wherein, in response to identifying that transmission of the second set of stored video data has been completed, the apparatus is configured to request an instantaneous decoder refresh and encoding to be performed on a next video frame as a reference frame related to the next video frame.

9. The apparatus of claim 1, wherein:
the apparatus is configured to receive feedback from the other apparatus containing a list of video frames transmitted by the apparatus prior to the processing component determining that the handover event has started, and
after the apparatus terminates transmission of the video data, the apparatus is configured to:
discard the video data associated with the reference frame in response to receiving the determination that video packets of the reference frame were not received by the other apparatus prior to the start of the handover event based on the feedback.

10. The apparatus of claim 9, wherein the apparatus is configured to:
prohibit retransmission of the video packets of the reference frame in response to the determination that the video packets of the reference frame were not received by the other apparatus prior to the start of the handover event based on the feedback.

11. The apparatus of claim 9, wherein the apparatus is configured to:
send the video data to memory in response to failure, based on the feedback, to identify whether the video packets of the reference frame were received successfully by the other apparatus.

12. The apparatus of claim 1, wherein the apparatus is configured to:
transmit video data, of the second set of video data, associated with video packets of the reference frame that is transmitted from the apparatus and received by the other apparatus prior to starting the handover event.

13. The apparatus of claim 1, wherein the apparatus is configured to:
adjust a bitrate of transmission after completion of the handover event.

14. The apparatus of claim 1, further comprising an antenna configured to transmit and receive communications between a transceiver in the apparatus and one or more nodes of a radio access network.

15. A non-transitory computer readable storage medium including instructions that, when executed by hardware processing circuitry of an apparatus, cause the apparatus to:
store a first set of video data of a video call during handover;
determine, after handover has completed, a set of the stored video data having a predetermined set of characteristics determined contemporaneously with completion of handover;
discard the set of the stored video data, leaving a second set of video data; and
transmit the second set of video data,
wherein the predetermined set of characteristics includes:
whether a reference frame related to the set of the stored video data was successfully received by another apparatus prior to initiation of handover,
wherein the instructions, when executed by the hardware processing circuitry, cause the apparatus further to:
determine, from feedback from the other apparatus, whether video packets of the reference frame have been successfully received, the feedback comprising a list of video frames transmitted by the apparatus prior to the handover starting, and
discard the at least some of the second set of video packets associated with the reference frame in response to determining that the video packets of the reference frame have not been successfully received.

16. The non-transitory computer readable storage medium of claim 15, including instructions that when executed by the hardware processing circuitry cause the apparatus to, prior to discarding the set of video data:

determine, prior to transmission, whether transmission of the second set of video data would exceed at least one of a threshold bitrate or threshold delay, and in response to determining that transmission of the second set of video data would exceed the at least one of a threshold bitrate or threshold delay, add an oldest of the video data to the set of the video data until determining that transmission of the second set of video data would exceed neither the threshold bitrate nor the threshold delay.

17. The non-transitory computer readable storage medium of claim 16, wherein at least one of:

the threshold delay is proportional to a video frame interval multiplied by an expected uplink bandwidth of the apparatus for a cell to which the apparatus is connected after the completion of the handover event, and the threshold bitrate is an uplink maximum bitrate of a guaranteed bitrate bearer multiplied by a typical period for defining an uplink non-access stratum bandwidth.

18. The non-transitory computer readable storage medium of claim 15, including instructions that when executed by the hardware processing circuitry cause the apparatus to:

in response to determining that transmission of the second set of video data has been completed, perform an instantaneous decoder refresh and encoding on a next video frame as a reference frame.

19. A method of reducing video data loss in an apparatus, the method comprising:

suspending transmission of video data of a video call during handover and storing the video data during the handover;

identifying, after handover has completed, which portions of the stored video data satisfy a set of characteristics, wherein the set of characteristics includes:

whether a reference frame related to a portion of the stored video data was successfully received by another apparatus prior to initiation of handover;

identifying, from feedback from the other apparatus, if video packets of the reference frame are successfully received, the feedback comprising a list of video frames transmitted by the apparatus prior to the handover starting, and discarding video data associated with the reference frame if the video packets of the reference frame are not successfully received; and transmitting the stored video data that satisfies the set of characteristics.

20. The method of claim 19, further comprising:

identifying, prior to transmission, if transmission of remaining video data that remains after discarding the video data associated with the reference frame exceeds at least one of a threshold bitrate or threshold delay, and if transmission of the remaining video data exceeds the at least one of a threshold bitrate or threshold delay, adding an oldest of the video data to the set of the video data until transmission of the remaining video data exceeds neither the threshold bitrate nor the threshold delay.

21. The method of claim 20, wherein at least one of:

the threshold delay is proportional to a video frame interval multiplied by an expected uplink bandwidth of the apparatus for a cell to which the apparatus is connected after completing the handover event, and the threshold bitrate is an uplink maximum bitrate of a guaranteed bitrate bearer multiplied by a typical period for defining an uplink non-access stratum bandwidth.

22. The method of claim 20, further comprising:

if transmission of the remaining video data is completed, performing an instantaneous decoder refresh and encoding on a next video frame as a reference frame.

23. The method of claim 19, further comprising at least one of:

prohibiting retransmission of the video packets of the reference frame after the handover is completed if the video packets of the reference frame are not successfully received;

storing video data in response to if failure to identify if the video packets of the reference frame are successfully received; and adjusting a transmission bitrate after completing the handover.

24. The method of claim 19, wherein:

the handover comprises shifting transmission of the video call from a first external device to a second external device.

25. The method of claim 19, wherein:

the set of characteristics further comprises:

pending transmission time less than or equal to a predetermined percent of a latency deviation computed from a real-time transport control protocol report, and aggregated size of the remaining video data less than or equal to a predetermined size.

26. The method of claim 19, wherein:

transmitting the portions of the stored video data that satisfy the set of characteristics comprises transmitting only the portions of the stored video data that satisfy the set of characteristics.

* * * * *